Sept. 30, 1969    HANS-JÜRGEN HOFFMANN ET AL    3,469,661
HYDRAULIC SHOCK ABSORBER AND FLUID RESERVOIR MEANS THEREFOR
Filed Feb. 27, 1967                                        6 Sheets-Sheet 1

INVENTORS
Hans Jürgen HOFFMANN
Manfred LÖHR
By
Michael S. Striker their ATTORNEY Sept. 30, 1969   HANS-JÜRGEN HOFFMANN ET AL   3,469,661
HYDRAULIC SHOCK ABSORBER AND FLUID RESERVOIR MEANS THEREFOR
Filed Feb. 27, 1967                                6 Sheets-Sheet 6

INVENTORS
Hans Jürgen HOFFMANN
Manfred LÖHR
By their ATTORNEY

United States Patent Office 3,469,661
Patented Sept. 30, 1969

3,469,661
HYDRAULIC SHOCK ABSORBER AND FLUID RESERVOIR MEANS THEREFOR
Hans-Jürgen Hoffmann and Manfred Löhr, Hohenlimburg, Germany, assignors to Hoesch Aktiengesellschaft, Dortmund, Germany
Filed Feb. 27, 1967, Ser. No. 618,769
Claims priority, application Germany, Feb. 26, 1966, H 58,664
Int. Cl. F16d 57/06
U.S. Cl. 188—100
20 Claims

ABSTRACT OF THE DISCLOSURE

A shock absorber wherein the connection between the piston rod and the piston consists of an inner cylinder which is received with clearance in the pressure cylinder and defines a compartment for reception of liquid in response to thermal expansion of liquid or in response to deeper penetration of the piston rod into the pressure cylinder. The inner cylinder takes up space which is necessary to provide a minimum distance between the piston and the point where the piston rod extends from the pressure cylinder so that the piston rod can take up greater bending stresses. The moment of resistance of the inner cylinder at least equals the moment of resistance of the piston rod.

Background of the invention

The present invention relates to shock absorbers. More particularly, the invention relates to improvements in so-called McPherson shock absorbers wherein a double-acting piston reciprocates in a pressure cylinder and is connected with a reciprocable piston rod. Such shock absorbers are utilized in combination with pneumatic or steel springs on automotive vehicles, particularly in the region of the front axle. and may be connected with a bracket, arm or steering knuckle in the front suspension system. In addition to providing a cushioning action, they can also participate in suspension and steering of wheels.

A serious drawback of presently known shock absorbers is that the length of the piston rod must considerably exceed the length of the maximum stroke, i.e., that a substantial part of the piston rod remains in the pressure cylinder when the piston rod is moved to its outermost position. This is due to the fact that a minimum distance must be preserved between the piston and the point where the piston rod extends through the pressure cylinder in order to insure that the piston rod and its connection with the piston can successfully withstand substantial bending stresses, especially such stresses which are transmitted by the wheels in response to steering of the vehicle. The diameter of the pressure cylinder cannot be increased at will because the space for accommodation of the shock absorber in the front wheel suspension system of a vehicle is limited. Furthermore, the piston rod normally consists of high-quality metallic material and its surfaces must be finished and treated with a high degree of precision; therefore, it is desirable to utilize a relatively short piston rod of small diameter.

Accordingly, it is an important object of the present invention to provide a shock absorber wherein the length of the piston rod need not unduly exceed the length of maximum strokes for the sole purpose of preventing excessive bending stresses and wherein the piston rod may be produced with substantial savings in material and man hours.

Another object of the invention is to provide a shock absorber which occupies little room, wherein the internal space of the pressure cylinder is utilized with utmost efficiency, and which is capable of resisting greater bending stresses than presently known shock absorbers of similar dimensions.

An additional object of the invention is to provide a novel motion-and-stress-transmitting connection between the piston and piston rod of a shock absorber for automotive vehicles or the like.

A concomitant object of our invention is to provide a shock absorber wherein the connection between the piston and piston rod performs a series of additional important functions.

An ancillary object of the invention is to provide a novel system of liquid flow regulating valves in a shock absorber of the above outlined characteristics.

Still another object of the invention is to provide a shock absorber which can utilize a piston of relatively large diameter, which operates properly at relatively low pressures of shock absorber liquid therein, and wherein the wear on its bearings and other movable parts is less than in presently known shock absorbers.

Summary of the invention

Briefly stated, one feature of our invention resides in the provision of a shock absorber which comprises a first cylinder or pressure cylinder containing a supply of shock absorber oil or another suitable liquid, a piston slidably disposed in the first cylinder to divide the interior of the first cylinder into a first and second chamber and having at least one flow-restricting passage connecting the two chambers, a piston rod reciprocably mounted in one end of the first cylinder and extending into the first chamber, a second cylinder provided in the first chamber and having ends connected with the piston and piston rod, a liquid-receiving compartment provided in the second cylinder and at least one channel connecting the compartment with at least one of the chambers in the first cylinder so that the compartment can receive liquid in response to thermal expansion of such liquid and also in response to movement of the piston rod toward the other end of the first cylinder, and biasing means provided at least in part in the second cylinder to oppose entry of liquid into the compartment. The moment of resistance of the second cylinder at least equals the moment of resistance of the piston rod, and the biasing means may comprise a supply of compressed gas accommodate at least in part in the interior of the second cylinder and a diaphragm which separates the supply of gas from liquid in the compartment. Alternatively, the supply of gas can be in direct contact with liquid in the compartment or the second cylinder can accommodate a second piston or a float which separates the supply of gas from liquid in the second cylinder.

The novel features which are considered as characteristic of the invention are set forth in particular in the appended claims. The improved shock absorbed itself, however, both as to its construction and the mode of assembling and operating the same, together with additional features and advantages thereof, will be best understood upon perusal of the following detailed description of certain specific embodiments with reference to the accompanying drawing.

Description of the preferred embodiments

Figure 1:
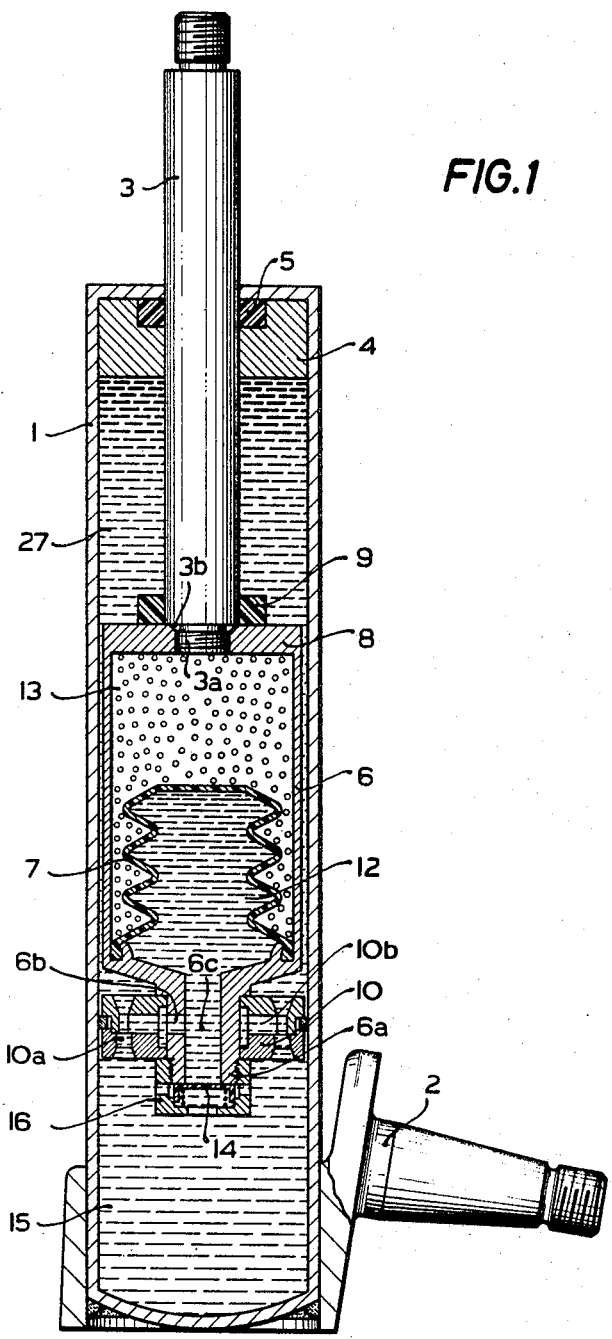
FIG. 1 is an axial section through a shock absorber which embodies one form of our invention and wherein the second cylinder accommodates an unvarying supply of compressed gas.

Referring first to FIG. 1, there is shown a shock absorber which comprises a first cylinder or pressure cylinder 1 the lower end of which is connected with an element 2 of a suspension system in an automotive vehicle. In the illustrated embodiment, the element 2 is a steering knuckle which is welded to the closed lower end of the cylinder 1; however, it is equally possible to provide a separable connection between these parts. The cylinder 1 accommodates a piston 10 which divides its interior into a first or upper chamber 27 and a second or lower chamber 15. These chambers are filled with shock absorber oil or another suitable liquid medium and communicate with each other through flow-restricting passages 10a provided in the piston 10. The piston rod 3 of the piston 10 is reciprocable in the upper end wall of the cylinder 1 and passes through a ring-shaped bearing member 4 which accommodates an annular sealing element 5.

The connection between the inner end of the piston rod 3 and the piston 10 comprises a second or inner cylinder 6 which is received with clearance in the pressure cylinder and accommodates a collapsible diaphragm in the form of a bellows 7. The open lower end portion of the diaphragm 7 has a bead which is sealingly secured to the lower end wall of the cylinder 6 and the interior of this diaphragm defines a compartment 12 which can receive liquid from the chambers 15, 27 through channels 10b provided in the piston 10 and registering channels 6b provided in the tubular lower end portion 6a of the cylinder 6. The end portion 6a extends through the piston 10 and defines an axial channel 6c which connects the compartment 12 with the lower chamber 15. This channel 6c accommodates a one-way valve 14 which permits the liquid to flow from the compartment 12 into the chamber 15.

The space 13 above and around the diaphragm 7 accommodates a supply of compressed gas which constitutes with the diaphragm a biasing means serving to expel liquid from the compartment 12 when the piston rod 3 is moved upwardly or when the cylinder 1 moves downwardly. The gas may be introduced in response to partial unscrewing of a threaded stem 3a which is provided at the inner end of the piston rod 3 and meshes with the upper end wall 8 of the cylinder 6. The lowermost portion of the piston rod 3 is surrounded by an annular elastic cushion 9 which abuts against the underside of the bearing member 4 in fully extended position of the piston rod. An annular seal 3b prevents escape of gas from the space 13 when the stem 3a is driven home.

The tubular lower end portion 6a of the cylinder 6 is held against axial movement with reference to the piston 10 by a coupling nut 16 which bears against the underside of the piston and preferably accommodates the one-way valve 14.

If desired, the diaphragm 7 may be replaced by a piston or float which is in sealing engagement with the cylindrical internal surface of the cylinder 6 and moves up or down, depending upon whether the compartment 12 receives liquid from the chamber 15 and/or 27 or discharges liquid via channel 6c.

The operation is as follows:

If the piston rod 3 is caused to move toward the lower end of the cylinder 1 and to thereby displace the piston 10 and inner cylinder 6, some liquid must be displaced from the chambers 15, 27 and such liquid flows via channels 10b, 6b and into the compartment 12. The valve 14 prevents entry of liquid into the lower end of the channel 6c. The diaphragm 7 expands and the gas in the space 13 is compressed. The damping action is produced in response to flow of liquid through the passages 10a of the piston 10.

If the piston rod 3 is thereupon moved in the opposite direction so that it displaces a lesser quantity of liquid in the interior of the cylinder 1, the gas in the space 13 expands and the diaphragm 7 forces the liquid to flow from the compartment 12, via channel 6c, valve 14, and into the lower chamber 15.

The moment of resistance of the cylinder 6 at least equals the moment of resistance of the piston rod 3.

Figure 2:
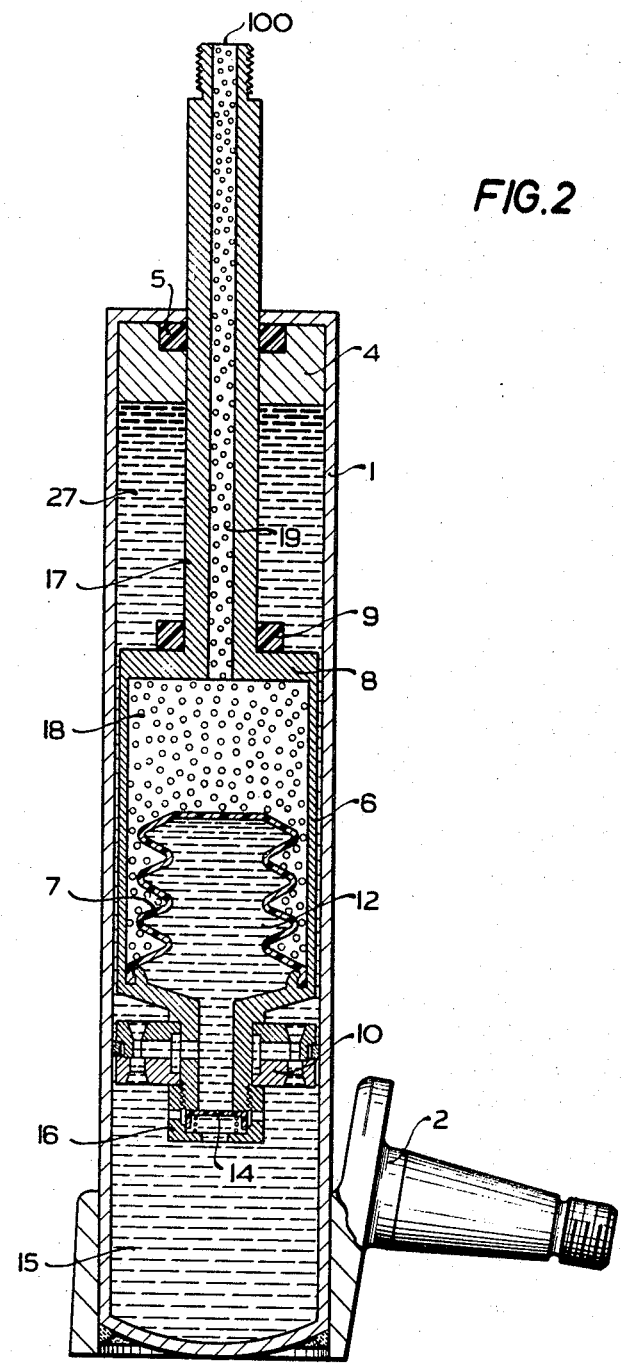
FIG. 2 is a similar axial section through a second shock absorber wherein the gas may be admitted into or evacuated from the second cylinder through an axial bore of the piston rod.

FIG. 2 illustrates a slightly modified shock absorber wherein the piston rod 17 is integral with the upper end wall 8 of the inner cylinder 6. Such integral connection can be established by making the piston rod and inner cylinder of one piece, by welding, soldering, gluing, upsetting or in another suitable way. The piston rod has an axial bore 19 to accommodate some of the gas which also fills the space 18 above and around the diaphragm 7.

The upper end portion of the piston rod 17 is connected to a pneumatic or hydropneumatic spring 100 of known design. An important advantage of the construction shown in FIG. 2 is that the cylinder 6 can receive a larger quantity of liquid because such liquid may expel all of the gas from the space 18. In other words, the space 18 may but need not accommodate the entire biasing means for liquid in the compartment 12. The bore 19 of the piston rod 17 can admit or evacuate gas from the space 18 whereby such gas flows from or back into the spring 100.

It is clear that the piston rod 17 may be produced separately to be threadedly or permanently secured to the upper end wall 8 of the cylinder 6. The compartment 12 must receive all such liquid which is expelled from chambers 15, 27 in response to deeper penetration of the piston rod 3 or 17 into the cylinder 1 as well as liquid which is expelled from the chambers 15, 27 in response to thermal expansion.

An important advantage of the construction shown in FIG. 2 is that the static pressures within and around the inner cylinder 6 are always the same. Therefore, the dimensions of its cylindrical portion can be reduced without affecting the safety.

Figure 3:
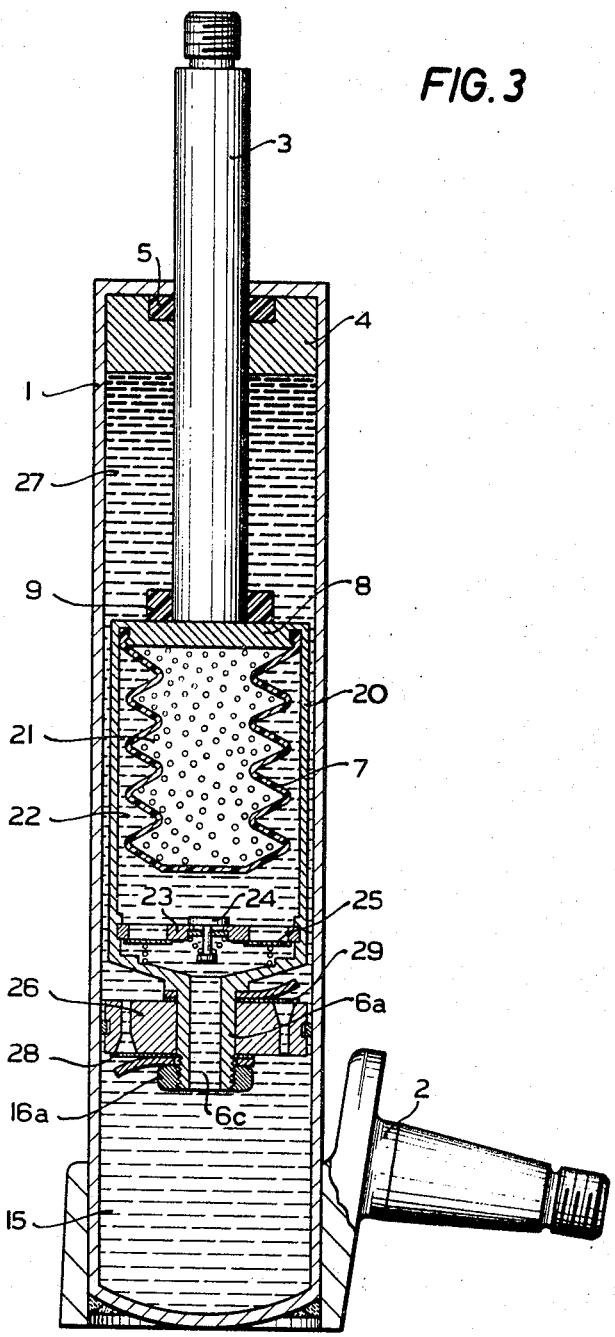
FIG. 3 is an axial section through a third shock absorber wherein the second cylinder accommodates a valve plate.

Referring to FIG. 3, there is shown a further shock absorber wherein the open end of the diaphragm 7 is sealingly secured to the upper end wall 8 of a modified inner cylinder 20. The latter has an internal annular groove which receives the marginal portion of a valve plate or support 23 provided with one or more first one-way valves 24 and with one or more second one-way valves 25. The valve 25 shown in FIG. 3 replaces the one-way valve 14 of FIG. 1 or 2 and serves to permit return flow of liquid from the compartment 22 into the lower chamber 15 via channel 6c. The lower end portion 6a of the inner cylinder 20 is anchored in the piston 26 by a simple nut 16a.

The flow-restricting passages of the piston 26 are defined by one-way valves 28, 29 one of which permits the flow of liquid from the chamber 27 into the chamber 15 and the other of which permits the liquid to flow in the opposite direction. However, it is to be understood that the piston 26 may be replaced by the piston 10 or by another suitable piston.

The space 21 in the interior of the diaphragm 6 accommodates a supply of compressed gas.

When the piston rod 3 is caused to penetrate deeper into the upper chamber 27 of the cylinder 1, liquid which is displaced from the chambers 15, 27 flows through the channel 6c and valve 24 to enter the compartment 22 in the inner cylinder 20. In this embodiment of our invention, the liquid which enters the compartment 22 causes the diaphragm 7 to contract and to further compress the gas in the space 21. The resistance which the one-way valve 24 offers to flow of liquid into the compartment 22 must be high enough to prevent a break in the liquid column in the chamber 27.

When the piston rod 3 is caused to move in upward direction, as viewed in FIG. 3, or when the cylinder 1 moves downwardly, the lower chamber 15 must receive liquid from the compartment 22, and such liquid flows through the channels defined by the one-way valves 25 and thereupon through the channel 6c. The diaphragm 7 expands and the pressure of gas in the space 21 decreases. The damping action is carried out by liquid which flows through the valves 28, 29 of the piston 26 and by the liquid flowing through the one-way valve 24 of the valve plate 23.

It will be seen that the nut 16a cooperates with the end portion 6a and piston 26 to clamp the flaps of the one-way valves 28, 29.

Figure 4:
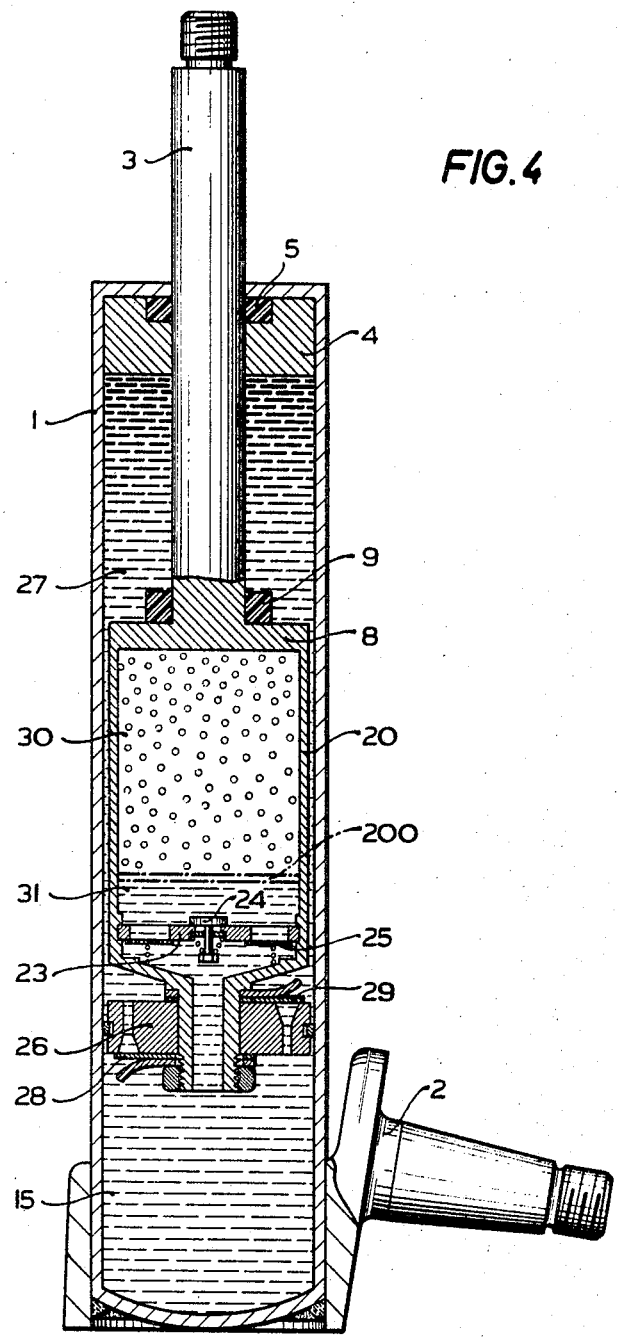
FIG. 4 is an axial section through a fourth shock absorber wherein the supply of gas is in direct contact with liquid in the interior of the second cylinder.

FIG. 4 illustrates a slight modification of the just described shock absorber. The diaphragm 7 of FIG. 3 has been omitted so that the body of gas filling the space 30 in the upper part of the inner cylinder 20 is in direct contact with liquid in the compartment 31, i.e., there is no clear-cut separation between the two fluids in the cylinder 20. Such shock absorbers can be utilized when the cylinder 1 is not turned upside down. Otherwise, the operation of this shock absorber is identical with that of the shock absorber shown in FIG. 3. If desired, the cylinder 20 can accommodate a piston or a float 200 (indicated by phantom lines) which separates the gas in the space 30 from the liquid in the compartment 31. The member 200 will move up or down, depending on the direction of movement of the piston rod 3 and on changes in temperature of the liquid.

Figure 5:
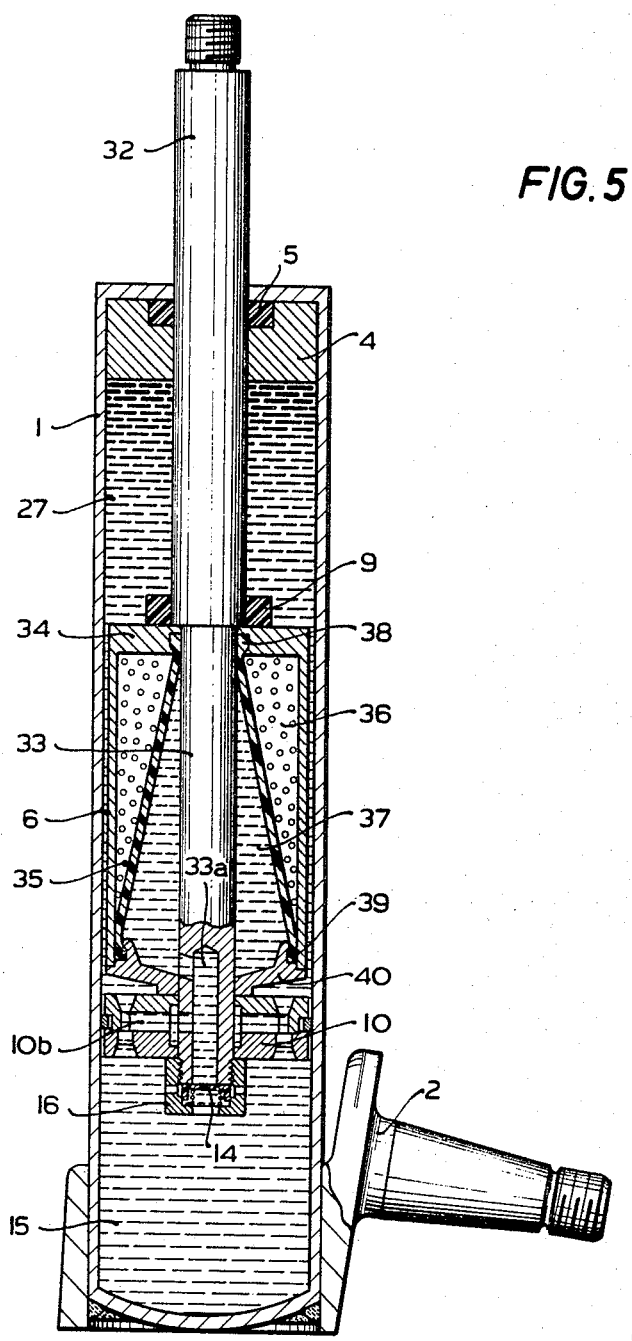
FIG. 5 is an axial section through a fifth shock absorber wherein the piston rod comprises an integral smaller-diameter extension which is affixed to the piston.

In the shock absorber of FIG. 5, the piston rod 32 comprises an integral extension 33 of reduced diameter which projects through the inner cylinder 6 and piston 10 and meshes with the nut 16. The lower end portion of the extension 33 has an axial blind bore 33a which connects the channels 10b of the piston 10 with a compartment 37 in the interior of a conical diaphragm 35. The annular space 36 around the diaphragm 37 contains a supply of compressed gas.

The upper and lower end portions of the diaphragm 37 are provided with beads 38, 39 which are respectively anchored in the upper and lower end walls 34, 40 of the inner cylinder 6. The lower end wall 40 is detachable from the remainder of the inner cylinder. The upper bead 38 simultaneously forms a fluidtight seal around the extension 33 to prevent leakage of fluid between the chamber 27 and space 36.

The lower end wall 40 is fixed to the extension 33 and/or to the piston 10 to center the inner cylinder 6 in the pressure cylinder 1. The cylinder 6 can be slipped onto the extension 33 from below, either in the position of FIG. 5 or turned upside down so that the end wall 40 is adjacent to the cushion 9. In the latter instance, the end wall 40 is preferably rigidly secured to the remainder of the inner cylinder 6.

Figure 6:
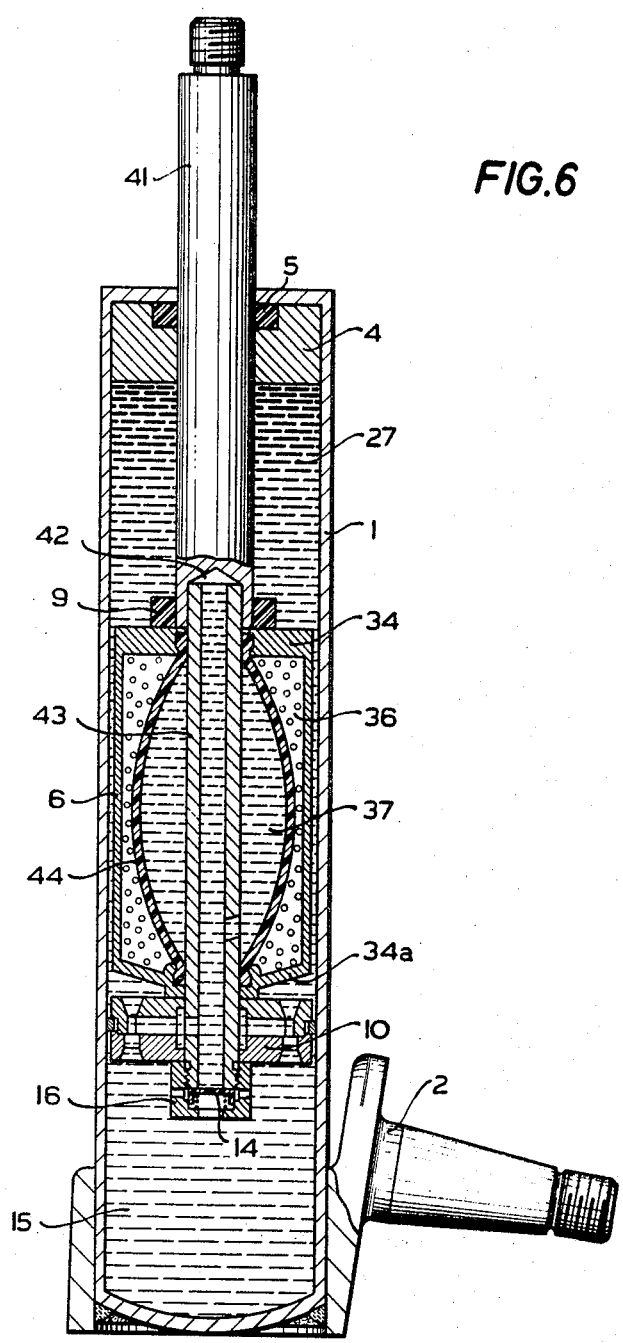
FIG. 6 is an axial section through a sixth shock absorber wherein the extension of the piston rod is constituted by a tube which carries the diaphragm of the biasing means.

Referring finally to FIG. 6, there is shown a slight modification of the just described shock absorber. The diaphragm 44 is constituted by an elastic sleeve whose end portions are provided with beads anchored in the upper and lower end walls 34, 34a of the inner cylinder 6. The piston rod 41 has an axial blind bore 42 which receives the upper end of a tube 43 which constitutes an extension of the piston rod and is in mesh with the nut 16. The axial bore of the tube 43 forms part of the compartment 37 in the diaphragm 44. The remaining part of the internal space 36 in the cylinder 6 accommodates a supply of compressed gas which tends to collapse the diaphragm 44 and to expel liquid from the compartment 37 back into the lower chamber 15 via one-way valve 14. The upper end of the tube 43 can be threadedly connected with the piston rod 41 or is permanently connected thereto by welding, soldering, gluing or in another suitable way. An important advantage of the shock absorber which is shown in FIG. 6 is that it may be produced at a reduced cost, namely, with substantial savings in the expensive material of the piston rod. Moreover, the work involved in precision-finishing the external surfaces of the piston rod 41 (plating with chromium or the like) is simpler and consumes less time than the treatment of a relatively long piston rod corresponding to the member 32, 33 of FIG. 5.

The diaphragm 44 of FIG. 6 can consist of rubber or elastomeric synthetic plastic material and is merely subjected to stretching forces when the shock absorber is in actual use. The operation of the shock absorbers shown in FIGS. 5 and 6 is analogous to that of the devices shown in FIGS. 1 and 2.

The inner cylinder 6 or 20 can be made of seamless tubing or similar material whose moment of resistance is at least as high as and normally higher than that of the piston rod. This is achieved with savings in expensive material of the piston rod.

A feature which is common to all embodiments of our invention is seen to reside in that the inner cylinder 6 or 20 maintains the piston 10 or 26 at a minimum distance from the bearing member 4 to insure that the piston rod can withstand substantial bending stresses. Moreover, utilization of the inner cylinder 6 or 20 as a means for connecting the piston rod with the piston brings about a series of additional advantages which were enumerated hereinbefore.

Another important advantage of our shock absorber is that the liquid in chambers 15 and 27 invariably cools the entire pressure cylinder 1 and that the unsprung mass is reduced to a minimum. As stated before, substantial savings can be achieved in the material of the piston rod, as well as in grinding, chromium plating and other work which must be performed in treatment of the piston rod. The piston rod need not be provided with stop means to limit its outward stroke because such function is performed by the upper end wall of the inner cylinder and cushion 9. This cushion can rest directly on the inner cylinder. Gases which might penetrate through the diaphragm will not penetrate into the chambers 15, 27 but will accumulate in the compartment of the inner cylinder so that they cannot interfere with proper operation of the shock absorber. In many presently known shock absorbers wherein the diaphragm is provided in the chamber below the piston, gases which penetrate the diaphragm cause foaming of shock absorber liquid in the pressure cylinder.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. A shock absorber comprising, in combination, a first cylinder containing a supply of liquid; a piston slidably disposed in and dividing the interior of said first cylinder into first and second chambers, said piston having at least one flow-restricting passage connecting said chambers; a piston rod reciprocably guided in one end of said cylinder and extending into said first chamber; a second cylinder provided in said first chamber between said piston and said piston rod, said second cylinder forming a liquid receiving compartment and having an outer peripheral surface inwardly spaced from the inner peripheral surface of said first cylinder and a moment of resistance at least equal to that of said piston rod which is connected to one end of said second cylinder, said second cylinder having an annular shoulder abutting against said piston and a tubular extension projecting from said shoulder tightly through and beyond a central bore in said piston into said second chamber, said tubular extension forming at least part of a channel connecting said compartment with at least said second chamber so that said compartment can receive liquid in response to thermal expansion of such liquid and in response to movement of said piston rod toward the other end of said first cylinder; and releasable means on the portion of said tubular extension projecting beyond said piston for securely clamping said tubular extension and therewith said second cylinder to said piston.

2. A shock absorber as defined in claim 1, wherein said biasing means comprises a supply of gas in said second cylinder and a tubular diaphragm separating said supply of gas from said compartment, said second cylinder having an end wall secured to said piston rod to center said second cylinder in said first cylinder and said diaphragm having an end portion sealingly affixed to said end wall.

3. A shock absorber as defined in claim 1 wherein said biasing means comprises a supply of gas provided in said second cylinder and a tubular diaphragm separating said supply of gas from said compartment, said diaphragm having an end portion provided with an annular bead sealingly affixed to said second cylinder.

4. A shock absorber as defined in claim 1, wherein one end of said piston rod is threadedly connected with the respective end of said second cylinder.

5. A shock absorber as defined in claim 1, wherein one end of said piston rod is permanently connected with the respective end of said second cylinder.

6. A shock absorber as defined in claim 1, wherein the second cylinder comprises a cylindrical portion received with clearance in the first chamber of said first cylinder and end wall integral with said cylindrical portion and connected with one end of said piston rod.

7. A shock absorber as defined in claim 1, wherein said second cylinder comprises a cylindrical portion received with clearance in the first chamber of said first cylinder and an end wall integral with said cylindrical portion and affixed to said piston.

8. A shock absorber as defined in claim 1, comprising a threaded connection between said piston rod and the respective end of said second cylinder, said second cylinder defining a space containing a supply of gas which opposes entry of liquid into said compartment, such gas being free to escape from said second cylinder in response to loosening of said threaded connection and said second cylinder being adapted to receive a fresh supply of gas by the same route.

9. A shock absorber as defined in claim 1, further comprising one-way valve means provided in said tubular extension to permit flow of liquid from said compartment to said second chamber during movement of said piston toward said one end of said cylinder while preventing such flow during movement of said piston toward said other end of said cylinder.

10. A shock absorber as defined in claim 1, further comprising a valve support in said second cylinder, first one-way valve means carried by said support to permit flow of liquid from said compartment to said second chamber during movement of said piston toward said one end of said first cylinder while preventing such flow during reverse movement of said piston, and second one-way valve means carried by said support and having an open cross-section smaller than that of said first one-way valve means to permit flow of liquid from said second chamber into said compartment during movement of said piston toward said other end of said first cylinder while preventing such flow during reverse movement of said piston.

11. A shock absorber as defined in claim 10, wherein said second cylinder has an internal groove and said support comprises a portion which is received in said groove.

12. A shock absorber as defined in claim 1, further comprising biasing means provided in said second cylinder to oppose entry of liquid into said compartment.

13. A shock absorber as defined in claim 12, wherein said biasing means comprises a supply of gas in said second cylinder.

14. A shock absorber as defined in claim 13, wherein said biasing means further comprises deformable diaphragm means provided in said second cylinder to separate said compartment from said supply of gas.

15. A shock absorber as defined in claim 13, wherein said biasing means further comprises a second piston reciprocably received in said second cylinder to separate said compartment from said supply of gas.

16. A shock absorber as defined in claim 13, wherein said piston rod has an axial bore open at the respective end of said second cylinder and wherein at least a portion of said supply of gas is accommodated in said bore.

17. A shock absorber as defined in claim 1, wherein said piston rod comprises an extension projecting into the interior of said second cylinder and with a portion thereof through and beyond said annular shoulder through said central bore in said piston, at least said portion being tubular and forming said tubular extension.

18. A shock absorber as defined in claim 17, wherein said extension of said piston rod forms an integral smaller-diameter part of said piston rod and is affixed to said piston.

19. A shock absorber as defined in claim 17, wherein said extension of said piston rod is a tube which is affixed to said piston rod.

20. A shock absorber as defined in claim 17, wherein said biasing means comprises a supply of gas provided in said second cylinder and a tubular diaphragm separating said supply of gas from said compartment, said diaphragm surrounding and having end portions sealingly engaging said extension of said piston rod.

References Cited

UNITED STATES PATENTS

| | | |
|---|---|---|
| 2,357,278 | 8/1944 | O'Connor. |
| 2,661,207 | 12/1953 | Allinquant _____ 267—64 |
| 3,105,574 | 10/1963 | Hoffmann et al. |

FOREIGN PATENTS

| | | |
|---|---|---|
| 1,056,946 | 5/1959 | Germany. |
| 478,591 | 1/1938 | Great Britain. |

OTHER REFERENCES

Remensperger: German printed application 1,127,234, April 1962.

GEORGE E. A. HALVOSA, Primary Examiner